US007382897B2

(12) United States Patent
Brown et al.

(10) Patent No.: US 7,382,897 B2
(45) Date of Patent: Jun. 3, 2008

(54) MULTI-IMAGE FEATURE MATCHING USING MULTI-SCALE ORIENTED PATCHES

(75) Inventors: Matthew Brown, Vancouver (CA); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 10/833,760

(22) Filed: Apr. 27, 2004

(65) Prior Publication Data

US 2005/0238198 A1 Oct. 27, 2005

(51) Int. Cl.
*G06K 9/00* (2006.01)
(52) U.S. Cl. .................. 382/103; 382/240; 358/450
(58) Field of Classification Search ........... 382/103, 382/107, 154–155, 168, 178, 181, 199, 190–194, 382/201–209, 216, 232, 240, 274, 197, 276, 382/284–294, 302, 305, 118, 242; 358/450; 348/94, 263, 638; 707/102
See application file for complete search history.

(56) References Cited

U.S. PATENT DOCUMENTS

| 6,009,437 | A | * | 12/1999 | Jacobs | .......... 707/102 |
| 6,038,349 | A | * | 3/2000 | Cullen | .......... 382/294 |
| 6,553,150 | B1 | * | 4/2003 | Wee et al. | .......... 382/243 |
| 6,650,791 | B1 | * | 11/2003 | Cullen | .......... 382/294 |
| 7,146,057 | B2 | * | 12/2006 | Clark et al. | .......... 382/242 |
| 7,162,081 | B2 | * | 1/2007 | Timor et al. | .......... 382/168 |

OTHER PUBLICATIONS

Anandan P., A computational framework and algorithm for the measurement of visual motion, Int'l J. of Comp. Vision, 1989, vol. 2, pp. 283-310.*

Cameiro, G., and A. Jepson, Multi-scale local phase-based features, Proc. of the Int'l Conf. on Comp. Vision and Pattern Recognition, 2003.*

Mikolajczyk, K. 2002. Detection of local features invariant to affine transformations, Ph.D. thesis, Institut National Pol~echnique de Grenoble, France.*

Anandan P., A computational framework and algorithm for the measurement of visual motion, *Int'l J. of Comp. Vision*, 1989, vol. 2, pp. 283-310.

Baumberg, A., Reliable feature matching across widely separated views, *Proc. of the Int'l Conf. on Comp. Vision and Pattern Recognition*, 2000, pp. 774-781.

Bergen, J., P. Anandan, K. Hanna, and R. Hingorani, Hierarchical model-based motion estimation, *Proc. of the European Conf. on Comp. Vision*, Springer-Verlag, May 1992, pp. 237-252.

Brown, M., D. Lowe, Invariant features from interest point groups, *Proc. of the 13th British Mach. Vision Conf.* Cardiff, 2002, pp. 253-262.

(Continued)

*Primary Examiner*—Seyed Azarian
(74) *Attorney, Agent, or Firm*—Lyon & Harr, LLP; Richard T. Lyon

(57) ABSTRACT

A system and process for identifying corresponding points among multiple images of a scene is presented. This involves a multi-view matching framework based on a new class of invariant features. Features are located at Harris corners in scale-space and oriented using a blurred local gradient. This defines a similarity invariant frame in which to sample a feature descriptor. The descriptor actually formed is a bias/gain normalized patch of intensity values. Matching is achieved using a fast nearest neighbor procedure that uses indexing on low frequency Haar wavelet coefficients. A simple 6 parameter model for patch matching is employed, and the noise statistics are analyzed for correct and incorrect matches. This leads to a simple match verification procedure based on a per feature outlier distance.

23 Claims, 9 Drawing Sheets

OTHER PUBLICATIONS

Brown, M., D. Lowe, Recognizing panoramas, *Proc. of the 9th Int'l. Conf. on Comp. Vision*, Nice, Oct. 2003, vol. 2, pp. 1218-1225.

Carneiro, G., and A. Jepson, Multi-scale local phase-based features, *Proc. of the Int'l Conf. on Comp. Vision and Pattern Recognition*, 2003.

Lucas, B., An iterative image registration technique with an application to stereo vision, *Proc. of the 7th Int'l. Joint Conf. on Artificial Intelligence*, 1981, pp. 674-679.

Lowe, D., Object recognition from local scale-invariant features, *Proc. of the Int'l. Conf. on Comp. Vision*, Corfu, Greece, Sep. 1999, pp. 1150-1157.

Lowe, D., Distinctive image features from scale-invariant keypoints, *Int'l. J. of Comp. Vision*, 2004.

Matas, J., O. Chum, M. Urban, and T. Pajdla, Robust wide baseline stereo from maximally stable extremal regions, *Proc. of the British Mach. Vision Conf.*, 2002.

Mikolajczyk, M., and C. Schmid, A performance evaluation of local descriptors, *Proc. of the Int'l. Conf. on Comp. Vision and Pattern Recognition*, 2003.

Rothwell, C., A. Zisserman, D. Forsyth, and J. Mundy, Canonical frames for planar object recognition, *Proc. of the European Conf. on Comp. Vision*, 1992, pp. 757-772.

Rothwell, C., A. Zisserman, D. Forsyth and J. Mundy, Planar object recognition using projective shape representation, *Int'l. J. of Comp. Vision*, 1995, No. 16, pp. 57-99.

Schmid C., and R. Mohr, Local grayvalue invariants for image retrieval, *IEEE Trans. on Pattern Analysis and Mach. Intelligence*, May 1995, vol. 19, No. 5, pp. 530-535.

Schmid C., R. Mohr, and C. Bauckhage, Evaluation of interest point detectors, *Proc. of the Int'l. Conf. on Comp. Vision*, Bombay, 1998, pp. 230-235.

Shi, J., and C. Tomasi, Good features to track, *IEEE Conf. on Comp. Vision and Pattern Recognition (CVPR '94)*, Seattle, Jun. 1994.

Schaffalitzky, F., and A. Zisserman, Multi-view matching for unordered image sets, or "How do I organize my holiday snaps?", *Proc. of the European Conf. on Comp. Vision*, 2002, pp. 414-431.

Tuytelaars, T., and L. Van Gool, Wide baseline stereo matching based on local, affinely invariant regions, *Proc. of the 11th British Mach. Vision Conf.*, Bristol, UK, 2000, pp. 412-422.

Mikolajczyk, K. 2002. Detection of local features invariant to affine transformations, Ph.D. thesis, Institut National Polytechnique de Grenoble, France.

European Search Report, Application No. EP05103415.5, completed Jun. 22, 2006, received Jul. 10, 2006.

\* cited by examiner

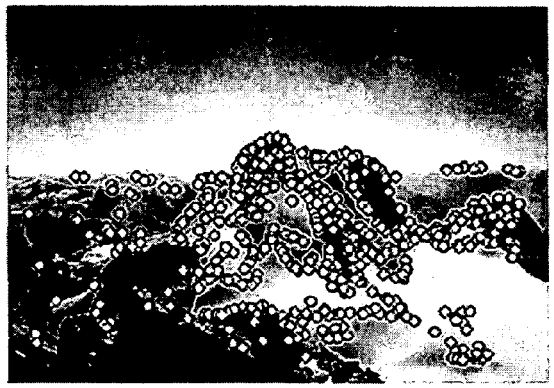 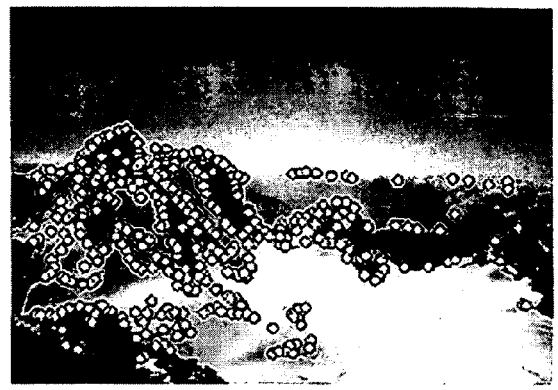
FIG. 8(a)   FIG. 8(b)
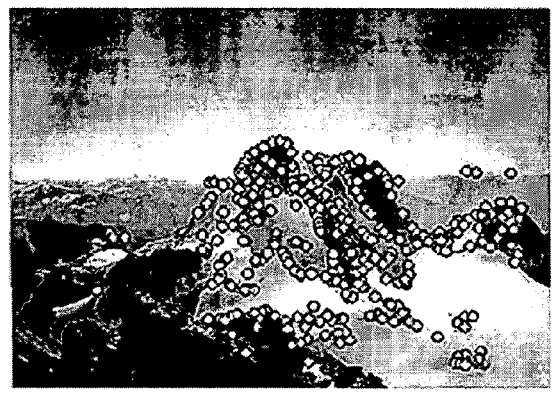 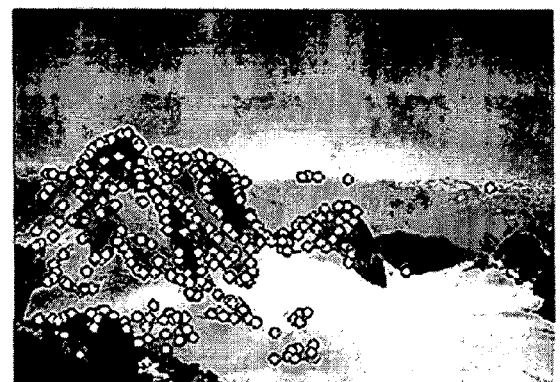
FIG. 9(a)   FIG. 9(b)
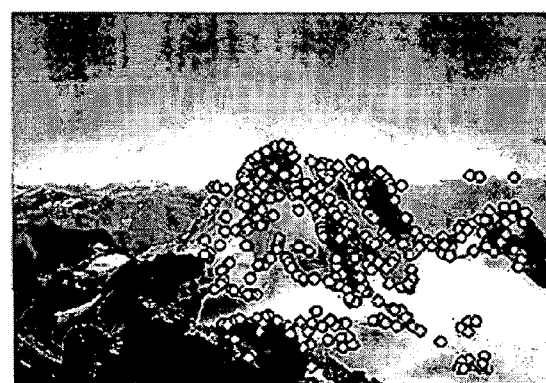 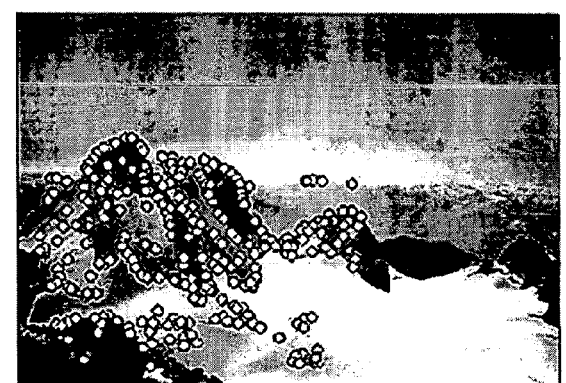
FIG. 10(a)   FIG. 10(b)

MULTI-IMAGE FEATURE MATCHING USING MULTI-SCALE ORIENTED PATCHES

BACKGROUND

1. Technical Field

The invention is related to identifying corresponding points among multiple images of a scene, and more particularly, to a system and process that quickly extracts features and finds correspondences across a large number of partially overlapping images of the scene.

2. Background Art

Finding corresponding features in images, which is commonly referred to as image matching, is an essential component of almost any vision application that tries to extract information from more than one image. Early work in image matching fell into two camps—feature based methods and direct methods. Feature based methods attempted to extract salient features such as edges and corners, and then to use a small amount of local information (e.g. correlation of a small image patch) to establish matches [8]. In contrast to the feature based methods, which used only a small amount of the available image data, direct methods attempted to use all of the pixel values in order to iteratively align images [1, 9]. Other approaches to matching and recognition have used invariants to characterize objects, sometimes establishing canonical frames for this purpose [14, 15].

At the intersection of these approaches are invariant features, which use large amounts of local image data around salient features to form invariant descriptors for indexing and matching. The first work in this area was by Schmid and Mohr [16] who used a jet of Gaussian derivatives to form a rotationally invariant descriptor around a Harris corner. Lowe extended this approach to incorporate scale invariance [10, 11]. Other researchers have developed features which are invariant under affine transformations [3, 20, 5]. Interest point detectors vary from standard feature detectors such as Harris corners or Difference-of-Gaussians (DOG) maxima to more elaborate methods such as maximally stable regions [12] and stable local phase structures [7].

Generally, interest point extraction and descriptor matching are considered as two basic steps, and there has been some progress in evaluating the various techniques with respect to interest point repeatability [17] and descriptor performance [13]. There have also been compelling applications to multi-view matching in the context of structure from motion [19] and panoramic imaging [6]. However, to date, none of these procedures provides the capability to quickly extract features and find correspondences across a large number of partially overlapping images of the scene.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for identifying corresponding points among multiple images of a scene based on a new class of invariant feature. The system and process is capable of quickly extracting features and finding correspondences across a large number of partially overlapping images of the scene. This technique performs extremely well when finding image correspondences for image stitching and video stabilization. It can also be readily extended to more general multi-image correspondence, e.g., for tracking features in video and building 3-D models from multiple images.

More particularly, the present system and process involves first identifying interest points in each image at varying resolutions. An interest point is a point whose location within an image is defined by at least one property attributable to the pixels in a pixel neighborhood of a predefined size around the point. In addition, each interest point is a point that can be assigned a unique orientation based on least one property attributable to the pixels (which can be the same property or properties employed to define the point location or another property or properties) in a pixel neighborhood around the point. This second neighborhood can be the same size as that used in defining the point location, or a differently sized neighborhood.

Once the interest points have been identified, a descriptor is established for each of the interest points. This descriptor characterizes each point in a manner that is substantially invariant to changes in image location, orientation, and scale, as well as to changes in the intensity of the pixels in the region around the point. Next, sets of substantially matching descriptors are identified among the images. The interest points associated with each set of matching descriptors that appear in different images are then designated as corresponding points (i.e., points that depict the same part of the scene).

In regard to identifying interest points in each image, this can be accomplished by, for each image, first forming an image resolution pyramid. At each level of the pyramid, locations in the image representative of a corner feature are identified. For example, in tested embodiments of the present system and process, so-called Harris corner features were employed. One way of identifying the corner feature locations is to find the location of each corner feature which exhibits a corner strength that is a local maximum of a pixel neighborhood of a prescribed minimum neighborhood radius that is centered on the location and which exceeds a prescribed minimum strength threshold. If the total number of identified corner locations exceeds a prescribed maximum number, then the neighborhood radius is incremented by some prescribed integer value and it is determined if the corner strength of each of the previously identified locations is still a local maximum of the pixel neighborhood currently under consideration and still exceeds the minimum strength threshold. If both conditions are not met, the corner location is eliminated from consideration. Once all the corner locations have been retested, it is again determined if the total number exceeds the maximum allowed. If so, the radius is incremented once again and the foregoing procedure is repeated. This iterative process continues until the number of corner locations equals or falls below the maximum number allowed. At that point, each of the remaining identified locations is designated as representative of a separate corner feature. The location of each remaining corner feature can be refined by assigning it the location where the maximum intensity of a 2D quadratic surface fitted over a local neighborhood of a prescribed size which is centered on the identified location under consideration, is exhibited.

Each of the remaining corner features is also assigned an orientation. In tested embodiments of the present system and process this was accomplished using a blurred gradient approach. Finally, the identified location of each of the remaining corner features is designated as a separate interest point having the orientation computed for the associated corner feature.

In regard generating a descriptor for each of the interest points, this can be accomplished by first establishing a descriptor region of a prescribed p×p size which is centered on the interest point location under consideration and which is oriented according to the orientation of the interest point. Next, a prescribed-sized d×d descriptor vector is formed that is smaller than the descriptor region and sampled therefrom using bilinear interpolation of the intensity values of the pixels within the region in a manner that avoids aliasing by sampling from the appropriate pyramid level. The descriptor vector is then normalized in regard to gain and bias, and a Haar wavelet transformation is performed on the normalized descriptor vector to produce a transformed vector.

In regard to finding substantially matching descriptors among the images, this is generally done by matching each of the transformed descriptor vectors to a prescribed number of its nearest neighbors in feature space. One way of accomplishing this task is to first generate a 3D hash table from the first three non-zero wavelet coefficients of each transformed descriptor vector. Then for each bin of the hash table, the distance between each three-coefficient vector found therein is computed. Each of the three-coefficient vectors is selected in turn and a prescribed number of its nearest neighbors in the same bin, but which are not associated with the same image as the selected vector, are identified based on the computed distances. This forms sets of potentially matching vectors. The interest points associated with the vectors in each of these sets are designated as corresponding points among the images. In tested embodiments of the matching procedure, the hash table is constructed to have 10 bins per dimension, with each bin having overlapping ranges of one half. It is noted that as an alternate to identifying a prescribed number of each vector's nearest neighbors, the nearest neighbors found in the same bin that are associated with each image respectively, except the image associated with the vector under consideration, up to a prescribed number for each image, can be identified instead to form the sets of potentially matching vectors.

In designating the interest points associated with the vectors in each set of potentially matching vectors as corresponding points, it is possible to eliminate erroneously identified matches. Generally, this entails eliminating any of the three-coefficient vectors from consideration as a potentially matching vector if their associated interest points do not actually correspond to an interest point in another image associated with another of the three-coefficient vectors in the same set of vectors. This can be accomplished in a number of ways. One way entails, for each set of matched vectors, first computing an outlier distance for the set and then determining if the distance computed for any of the matching vectors in the set is more than about 65% of the outlier distance. If a matching vector is found to have a distance that is more than about 65% of the outlier distance, then it is eliminated from consideration as a corresponding image point. This rejection strategy is referred to as outlier rejection using an outlier distance constraint. Another way to eliminate erroneously matched vectors from a set is perform a standard geometric outlier rejection procedure and eliminate the interest point associated with any vector as a corresponding point that is found to be an outlier. Essentially, this geometric outlier rejection procedure involves finding a transform that best matches all the points between two images and throwing out points that do not correspond within a specified tolerance when transformed. It is also possible to employ both of the foregoing rejection techniques. For example, in tested embodiments of the present system and process, the rejection strategy using the outlier distance constraint was employed first followed by the geometric outlier rejection procedure.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 8(a) and 8(b) show two images of a mountain scene with portions in common, where corresponding locations between the images, as identified before any outlier rejection processing, are shown as white dots.

FIGS. 9(a) and 9(b) show the same images as FIGS. 8(a) and 8(b), respectively, after the application of the outlier rejection technique employing an outlier distance constraint.

FIGS. 10(a) and 10(b) show the same figures as FIGS. 9(a) and 9(b), respectively, after the application of the geometric based outlier rejection technique.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
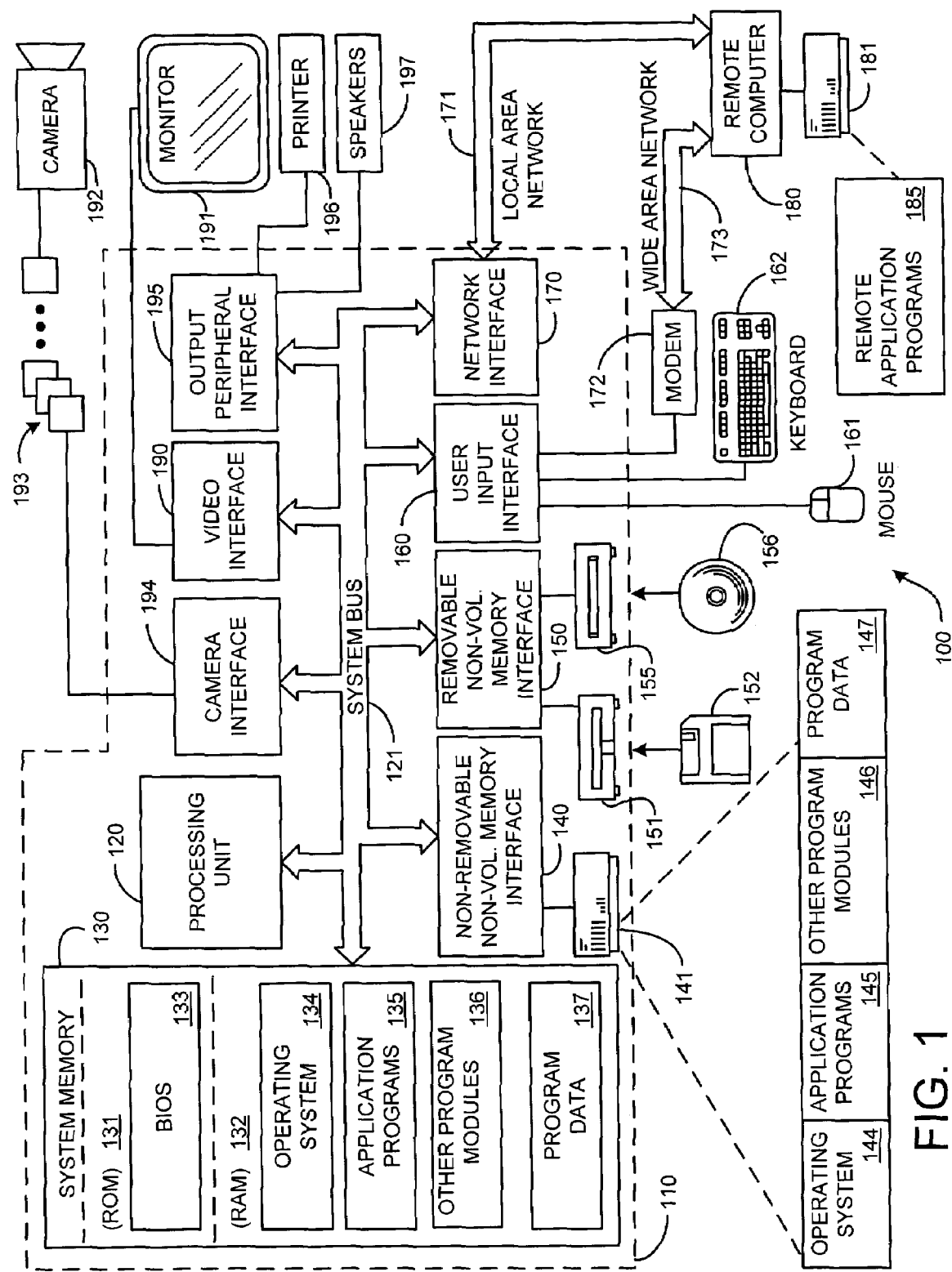
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 Multi-Image Feature Matching System and Process

Figure 2:
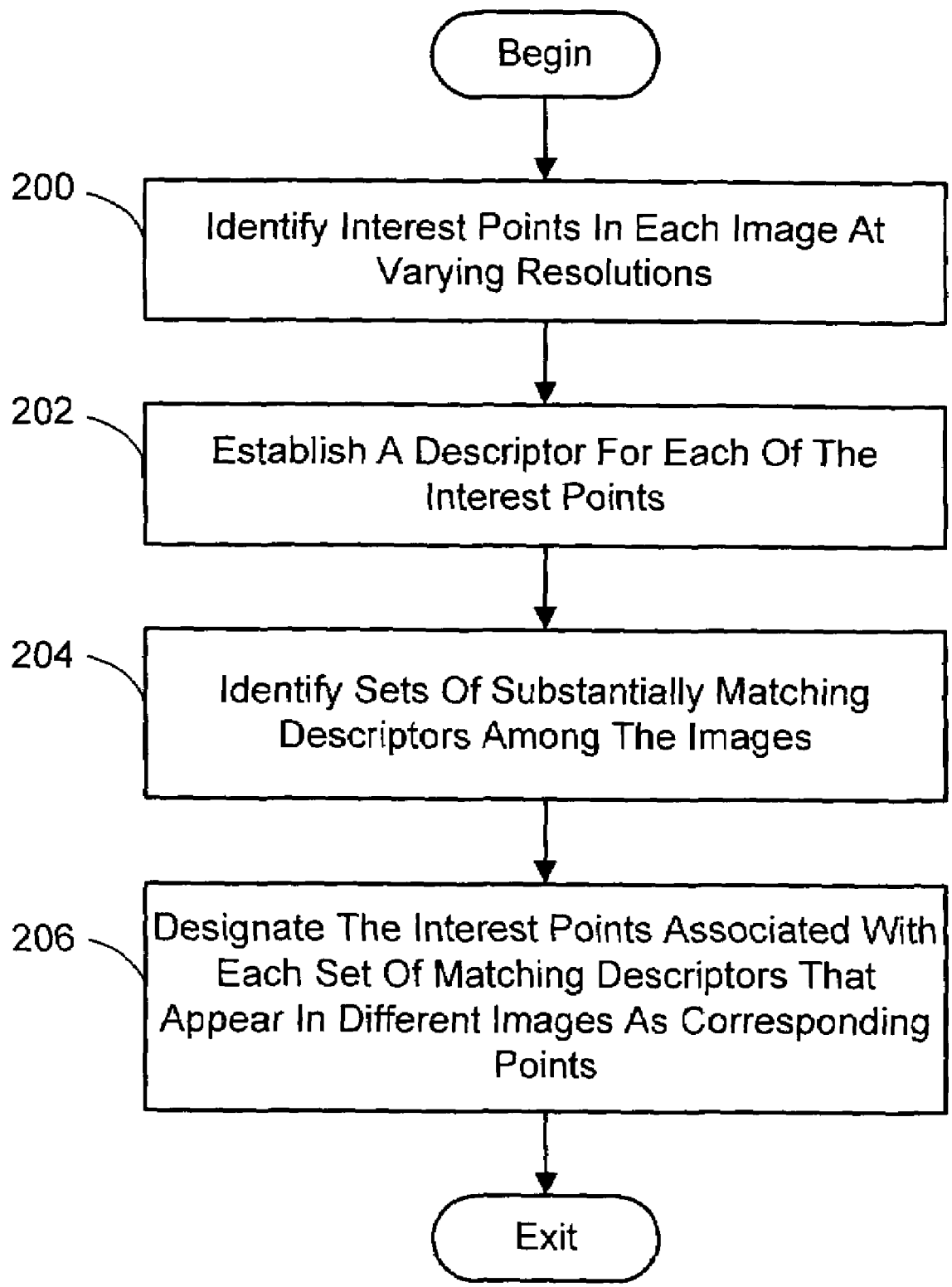
FIG. 2 is a flow chart diagramming an overall process for identifying corresponding points among multiple images of a same scene according to the present invention.

The exemplary operating environment having now been discussed, the remaining part of this description section will be devoted to a description of the program modules embodying the invention. Generally, the system and process according to the present invention involves identifying corresponding points among multiple images of a scene. In general, this is accomplished via the following process actions, as shown in the high-level flow diagram of FIG. 2. First, interest points are identified in each image at varying resolutions (process action 200). An interest point is a point whose location within an image is defined by at least one property attributable to the pixels in a pixel neighborhood of a predefined size around the point. In addition, each interest point is a point that can be assigned a unique orientation based on least one property attributable to the pixels (which can be the same property or properties employed to define the point location or another property or properties) in a pixel neighborhood around the point. This second neighborhood can be the same prescribed size as that used in defining the point location, or a differently sized neighborhood.

Once the interest points have been identified, in process action 202, a descriptor is established for each of the interest points. This descriptor characterizes each point in a manner that is substantially invariant to changes in image location, orientation, and scale, as well as to changes in the intensity of the pixels used to define the location and orientation of the point. Next, sets of substantially matching descriptors are identified among the images (process action 204). Finally, in process action 206, the interest points associated with each set of matching descriptors that appear in different images are designated as corresponding points (i.e., points that depict the same part of the scene).

The foregoing new class of invariant features represented by a feature descriptor that is generally a bias/gain normalized patch of intensity values will be described first in the sections below, followed by a description of the feature matching scheme.

2.1 Multi-Scale Oriented Features

The multi-scale oriented features are characterized by four geometric parameters and two photometric parameters. The geometric parameters are $t_1, t_2, \theta, l$, i.e., the x, y location of the center of a region or patch in an image, its orientation and scale. The photometric parameters are $\alpha, \beta$, i.e., the gain and bias of the patch. Given this representation, a simple 6 parameter model for patch matching is employed, and the noise statistics are analyzed for correct and incorrect matches. This leads to a simple match verification procedure based on a per feature outlier distance. More particularly, the transformation between corresponding image patches is:

$$I'(x')=\alpha I(x)+\beta+e \qquad (1)$$

where $$x' = Ax + t \text{ and } A = s\begin{bmatrix} \cos\theta & \sin\theta \\ -\sin\theta & \cos\theta \end{bmatrix}.$$

The error e represents imaging noise and modeling error.

The x, y location of the center of a feature is deemed to coincide with points where this transformation is well defined—namely where the autocorrelation of I(x) is peaked. Candidates for these points will be referred to as interest points. To compare features, one could in principle compute the maximum likelihood estimates for the transformation parameters between a pair of image locations. Assuming Gaussian noise, this can be done iteratively by solving a non-linear least squares problem. However, for efficiency, each feature can be characterized by invariants under the foregoing model, and closed form approximations for the model parameters between pairs of features can be used. The statistics of the error e can be employed to verify whether a match is correct or incorrect.

2.1.1 Interest Points

While there are many points in an image that can be characterized as having both a location and orientation [17], the interest points chosen for the tested embodiments of the present system and process are associated with so-called Harris corners. Interest points coinciding with these Harris corners are found as follows. For each input image I(x,y), an image pyramid is formed with the lowest level $P_0(x,y)=I(x,y)$ and higher levels related by smoothing and subsampling operations, i.e., $$P'_l(x,y)=P_l(x,y)*g_{\sigma_p}(x,y)$$

$$P_{l+1}(x,y)=P'_l(sx,sy) \quad (2)$$

where l denotes the pyramid level and $g_\sigma(x,y)$ denotes a Gaussian kernel of standard deviation σ. A subsampling rate of s=2 and pyramid smoothing of $\sigma_p$=1.0, were employed with success in the tested embodiments of this pyramid forming procedure. However, in general, values in the range of about 1.1 to 3.0 could be used for s and values in the range of about 0.55 to 1.5 could be used for $\sigma_p$. Interest points are extracted from each level of the pyramid. The Harris matrix at level l and position (x,y) is the smoothed outer product of the gradients $$H_l(x,y)=\nabla_{\sigma_d} P_l(x,y) \nabla_{\sigma_d} P_l(x,y)^T * g_{\sigma_i}(x,y) \quad (3)$$

where $\nabla_\sigma$ represents the spatial derivative at scale σ i.e.

$$\nabla_\sigma f(x,y) \nabla f(x,y)*g_\sigma(x,y) \quad (4)$$

In tested embodiments, the integration scale was set to $\sigma_i$=1.5 and the derivative scale was set to $\sigma_d$=1.0. The corner detection function $$f_{HM}(x,y) = \frac{det H_l(x,y)}{tr H_l(x,y)} = \frac{\lambda_1 \lambda_2}{\lambda_1+\lambda_2} \quad (5)$$

is then used, which is the harmonic mean of the eigenvalues $(\lambda_1,\lambda_2)$ of H. In the tested embodiments the interest points were deemed to be located where the corner strength $f_{HM}$(x,y) is a local maximum of a surrounding neighborhood and above a threshold of 10.0. However, it is noted that in general values in the range of about 0.5 to 2.5 could be used for $\sigma_i$, values in the range of about 0.5 to 2.5 could be used for $\sigma_d$, and the threshold could be any value down to zero. The size of the aforementioned surrounding neighborhood will be discussed shortly.

The reason for the foregoing choice of an interest point detection function can be understood in terms of the relationship between H and the local autocorrelation function. For an image I(x), the first order Taylor expansion gives an expression for the local autocorrelation of:

$$e(x)=|I(x)-I_0|^2 = x^T \frac{\partial I}{\partial x} \frac{\partial I^T}{\partial x} x = x^T H x \quad (6)$$

Interest points are located at peaks in the autocorrelation function. This means that e(u) is large for all unit vectors u, which is equivalent to requiring that both eigenvalues of H are large.

Figure 3:
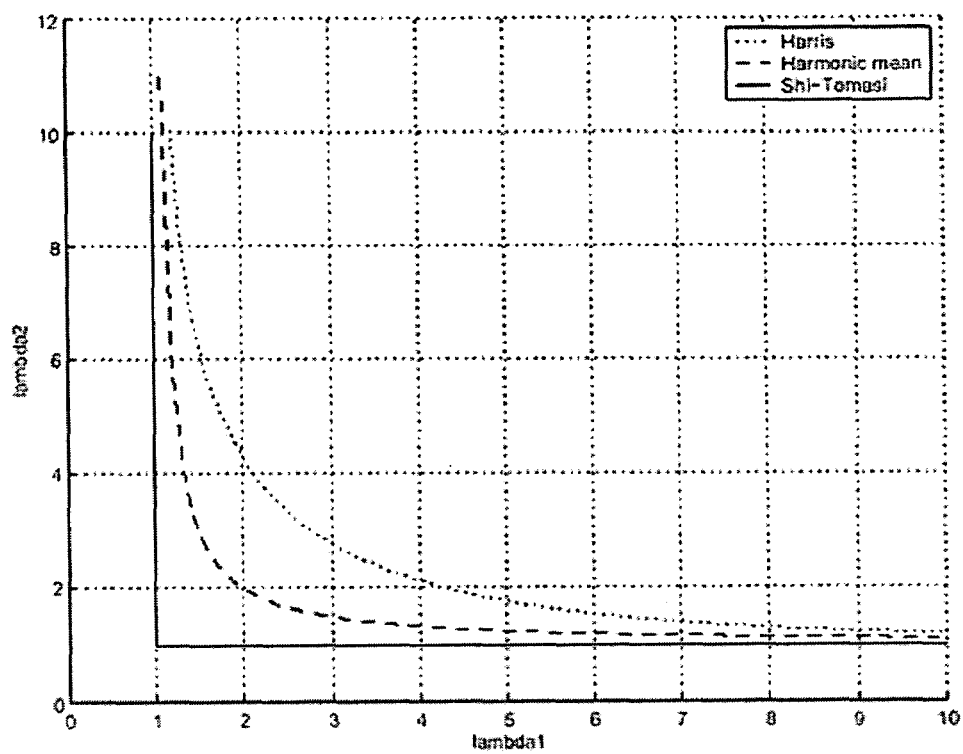
FIG. 3 is a graph comparing isocontours of the harmonic mean interest point detection function with those of the Harris and Shi-Tomasi functions.

It is noted that corner detection functions other than the harmonic mean function could also be employed in finding interest point locations. For example, the so-called Harris (i.e., $f_H=\lambda_1\lambda_2-0.04(\lambda_1+\lambda_2)^2$=det H-0.04(tr H)$^2$) and Shi-Tomasi (i.e., $f_{ST}$=min($\lambda_1,\lambda_2$)) functions could be used as substitutes. FIG. 3 compares isocontours of the harmonic mean interest point detection function with these others.

Note that all the detectors require both eigenvalues to be large. Preliminary experiments suggest each of these detectors give roughly the same performance, and so could be used interchangeably.

2.1.1.1 Adaptive Non-Maximal Suppression

Due to computational considerations it is desirable to generate a fixed number of interest points for each image. In order to select interest points which are well distributed spatially in the image, an adaptive non-maximal suppression strategy can employed. More particularly, interest points are suppressed based on the corner strength $f_{HM}$ and only those that are a maximum in a neighborhood of radius r pixels are retained. In order to extract an approximately constant number $n_{ip}$ of interest points from each image, it is possible to search over the non-maximal suppression radius r. In tested embodiments, an initial value of r=$r_{init}$=4.0 was employed, although this could generally range from about 1 to 15. Then, consecutive integer values are searched over for the maximum value of r such that no more than $n_{ip}$ interest points are extracted from each image. In tested embodiments, $n_{ip}$=500, however, in general this could range from as low as about 10 up to several thousand depending on the size and nature of the image. It was found that distributing interest points spatially in the foregoing way, as opposed to selecting based on max corner strength, results in fewer dropped image matches.

2.1.1.2 Sub-Pixel Accuracy

Better results can be achieved by locating the interest points to sub-pixel accuracy by fitting a 2D quadratic to the corner strength function in a local neighborhood (at the detection scale) and finding its maximum. More particularly, $$f(x) = f + \frac{\partial f^T}{\partial x}x + \frac{1}{2}x^T \frac{\partial^2 f}{\partial x^2} x \quad (7)$$

where x denotes position (x,y), and $f(x)=f_{HM}(x)$ is the corner strength measure. In tested embodiments a 3×3 neighborhood was used. Derivatives are computed from the 3×3 neighborhood using pixel differences i.e., $$\frac{\partial f}{\partial x} = (f_{1,0}-f_{-1,0})/2 \quad (8)$$

$$\frac{\partial f}{\partial y} = (f_{1,0}-f_{-1,0})/2$$

$$\frac{\partial^2 f}{\partial x^2} = f_{1,0}-2f_{0,0}+f_{-1,0}$$

$$\frac{\partial^2 f}{\partial y^2} = f_{0,1}-2f_{0,0}+f_{0,-1}$$

$$\frac{\partial^2 f}{\partial x \partial y} = (f_{-1,-1}-f_{-1,1}-f_{1,-1}-f_{1,1})/4$$

The x and y components of the subpixel location is thus given by:

$$x_m = x_0 - \frac{\partial^2 f}{\partial x^2}^{-1} \frac{\partial f}{\partial x} \quad (9)$$

$$y_m = y_0 - \frac{\partial^2 f}{\partial y^2}^{-1} \frac{\partial f}{\partial y}$$

Figure 4:
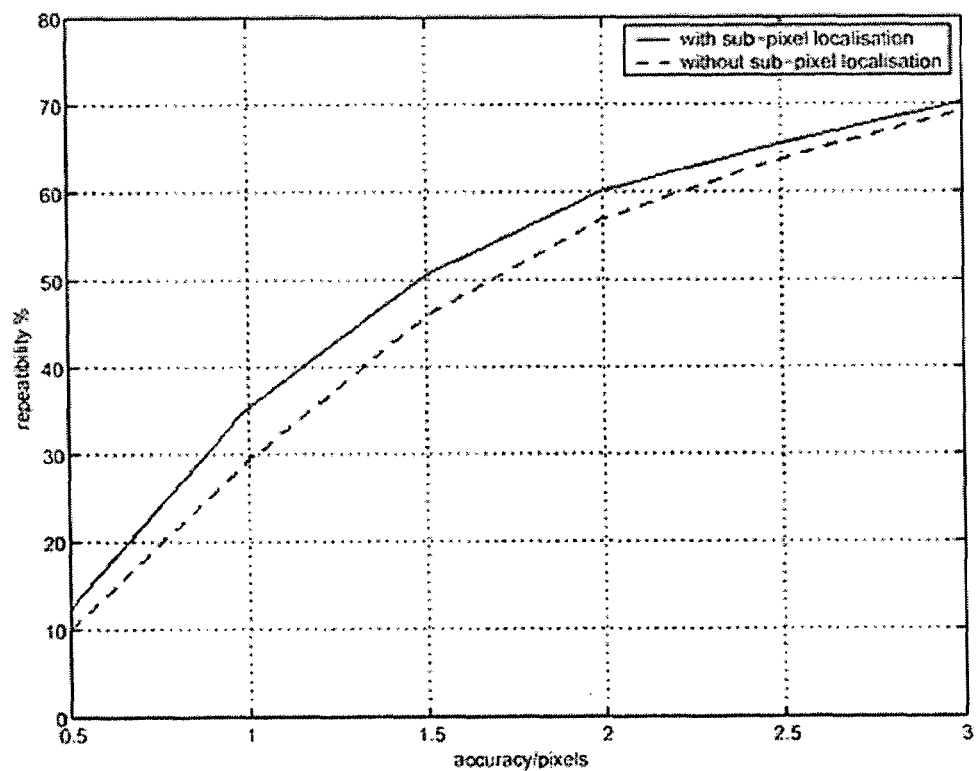
FIG. 4 is a graph demonstrating the repeatability of interest points with and without sub pixel localization.

Repeatability can be defined as the fraction of interest points whose transformed position is correct up to some tolerance. The repeatability of interest points with and without sub pixel localization using the foregoing procedures is shown in FIG. 4. Note that sub-pixel localization gives approximately 5% improvement in repeatability.

2.1.2 Orientation

Each interest point has an orientation θ, where the orientation vector [cos θ, sin θ]=u/|u|=û comes from the smoothed local gradient $$u_l(x,y) = \nabla_{\sigma_o} P_l(x,y) \qquad (10)$$

The integration scale employed in tested embodiments for orientation is $\sigma_o=4.5$. A large derivative scale is desirable so that the motion field $u_l(x,y)$ varies smoothly across the image, making orientation estimation robust to errors in interest point location. However, in general, the integration scale for orientation can range between about 2.0 and 7.0.

It is noted that while a blurred local gradient approach was used in tested embodiments of the present system and process to establish an orientation for each interest point, other methods could also be used. For example, other examples of orientation measurement methods include using a maxima of a gradient histogram or eigenvectors of the H matrix.

2.1.3 Descriptor Vector

Figure 6:
FIG. 6 is an image of a mountain scene where a descriptor region associated with an interest point atop a peak is shown as a white box, and where the location of the interest point is shown as a white dot at the center of the box and a line extending from the interest point is included to indicate the orientation direction assigned to the point.
Figure 7:
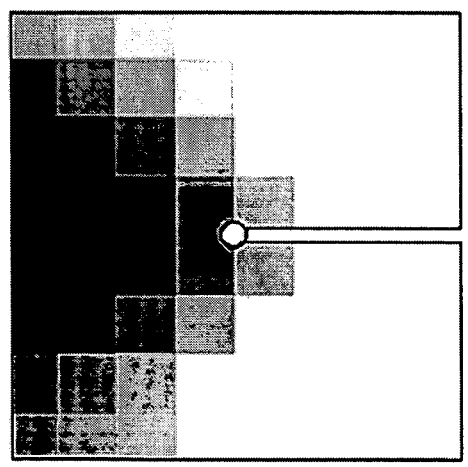
FIG. 7 is an image showing an 8×8 descriptor formed from the descriptor region of FIG. 6.

For each oriented interest point (x,y,l,θ), the descriptor region is a patch of size p×p pixels at the detection scale. The patch is centered on (x,y) and oriented at an angle θ. From this p×p descriptor region, a descriptor vector of size of size d×d pixels is formed. In tested embodiments, p=40 and d=8, however, in general p can range between about 0.1 and 10 percent of the image size, with a proportional value for d. FIG. 6 shows an image of a mountain scene where a descriptor region associated with an interest point atop a peak is shown as a white box. Note that the location of the interest point is shown as a white dot and a line extending from the interest point is included to indicate the orientation direction assigned to the point. FIG. 7 shows an 8×8 descriptor formed from the descriptor region of FIG. 6. It is noted that the interest point and orientation line are shown in white in this figure as well.

In order to avoid aliasing/blurring when sampling, the descriptor is sampled at a pyramid level which results in sampling roughly once per pixel. One way of accomplishing this is to sample the descriptor from a level $l_s$ levels above the detection scale, where $$l_s = \text{floor}\left(\frac{\log p/d}{\log s} + 0.5\right) \qquad (11)$$

The descriptor vector is sampled using bilinear interpolation.

For example, in tested embodiments where p=40, d=8, and s=2, the descriptor would be sampled $l_s=2$ levels above the detection scale. However, suppose the interest point was detected at level l. This suggests sampling the descriptor from $P_{l+l_s}(x,y)=P_{l+2}(x,y)$. However, it has been found that better results can be achieved using an alternate procedure where instead the descriptor is sampled from $P'_{l+1}(x,y)$, where $P'_{l+1}(x,y)=P_{l+1}(x,y)*g_{\sigma_p}(x,y)$, i.e., blurring but not downsampling. Further, albeit smaller gains, are made by sampling from $P''_l(x,y)=P_l(x,y)*g_{2\times\sigma_p}(x,y)$.

2.1.3.1 Normalization

The descriptor vector is next normalized so that the mean is 0 and the standard deviation is 1, i.e., $$d_i = (d'_i - \mu)/\sigma \qquad (12)$$

where $d'_i$, $i \in \{1 \ldots d^2\}$ are the elements of the descriptor vector, with $$\mu = \frac{1}{d^2} \sum_{i=1}^{d^2} d'_i \text{ and } \sigma = \sqrt{\frac{1}{d^2} \sum_{i=1}^{d^2} (d'_i - \mu)^2}.$$

This makes the features invariant to affine changes in intensity (bias and gain).

2.1.3.2 Haar Wavelet Transform

Finally, a Haar wavelet transform is performed on the d×d descriptor vector $d_i$ to form a $d^2$ dimensional descriptor vector containing the wavelet coefficients $c_i$. Due to the orthogonality property of Haar wavelets, distances are preserved, i.e., $$\sum_i (d_i^1 - d_i^2)^2 = \sum_i (c_i^1 - c_i^2)^2 \qquad (13)$$

Accordingly, the nearest neighbors in a sum-squared difference sense are unchanged. However, the first 3 non-zero wavelet coefficients $c_1$, $c_2$, $c_3$ are used in an indexing strategy to be described shortly.

2.1.4 The Descriptor Generation Process Summary

Figure 5A:
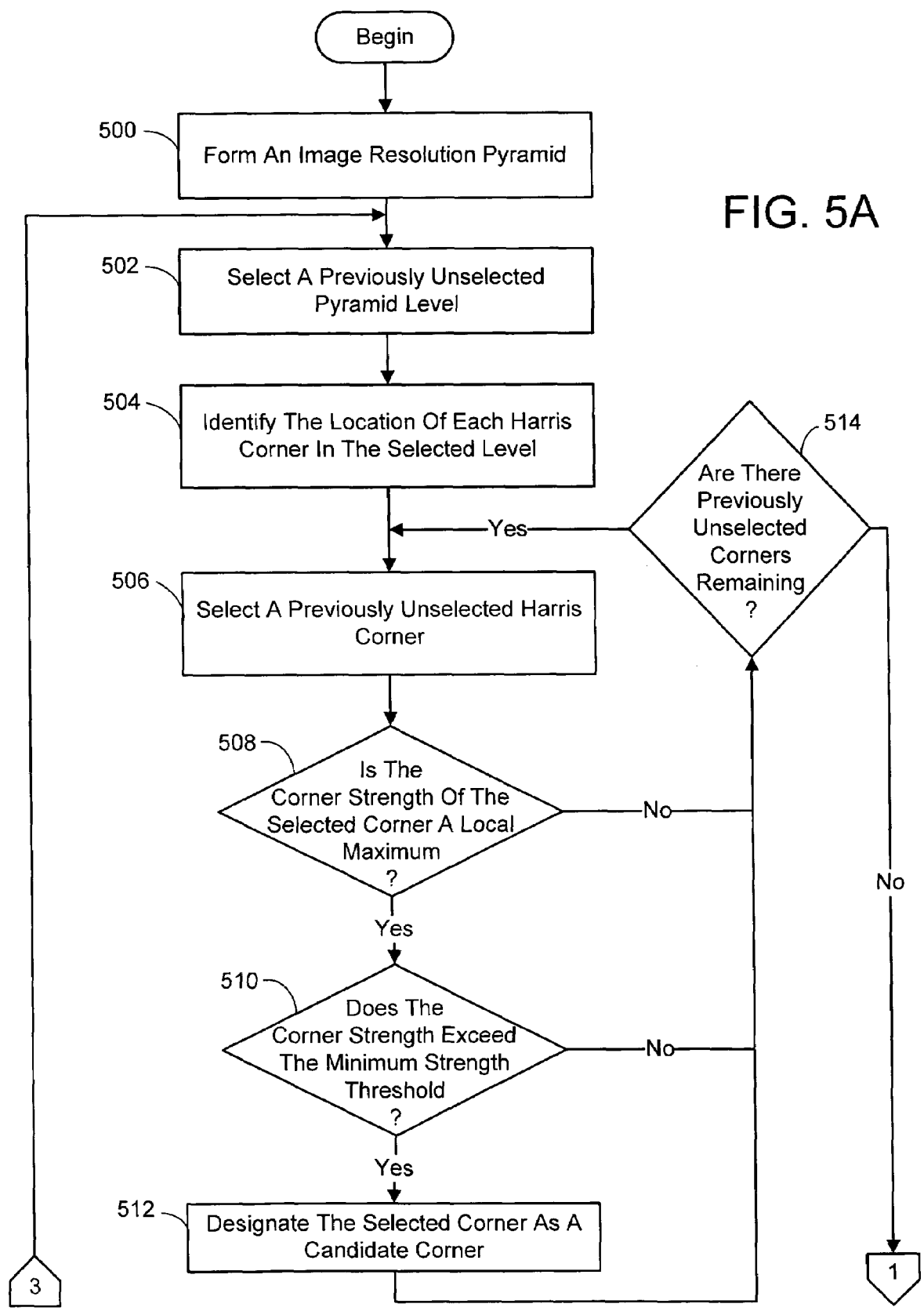
FIGS. 5A-5C are a flow chart diagramming a process for generating a descriptor vector in accordance with the present invention.
Figure 5B:
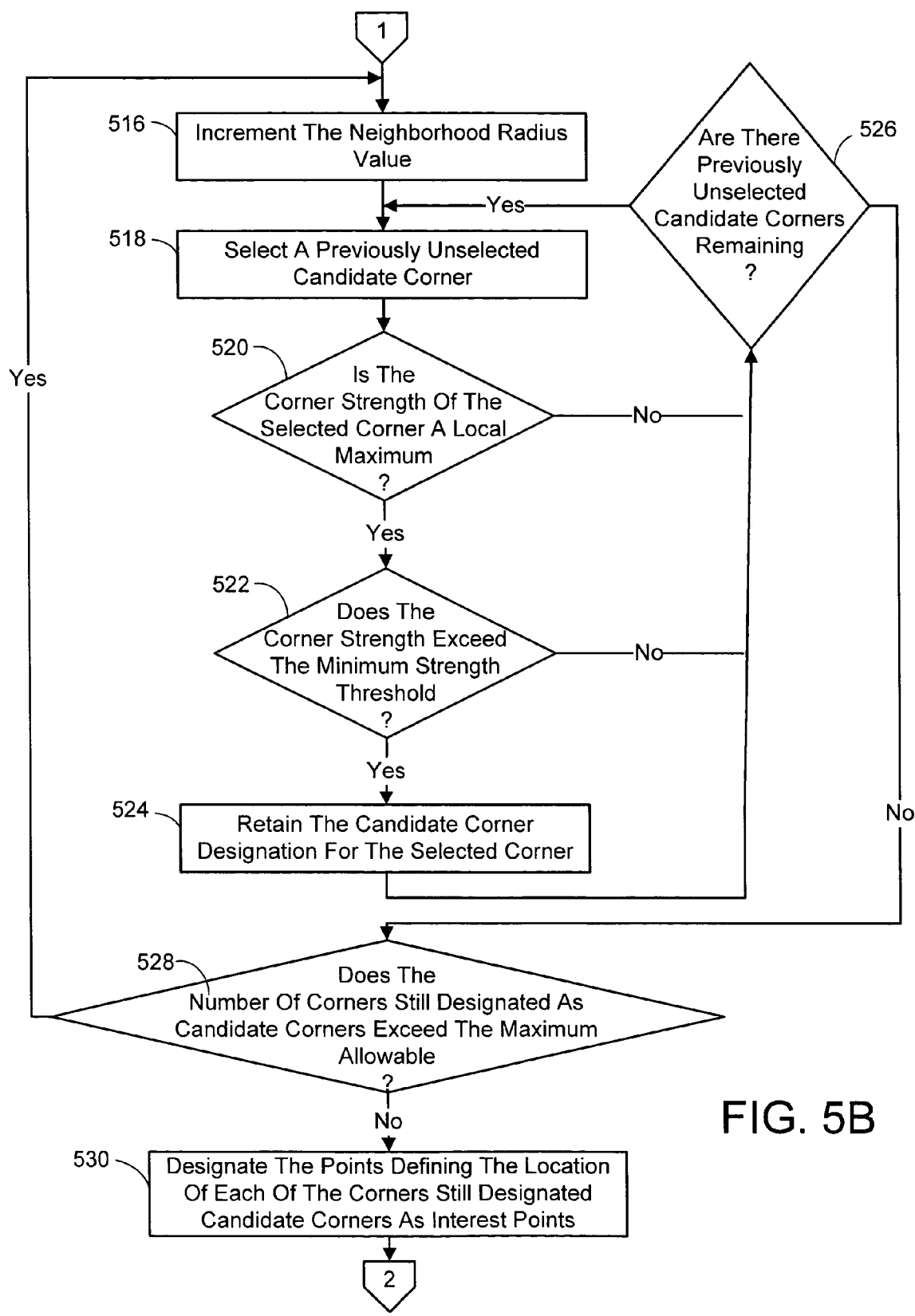
Figure 5C:
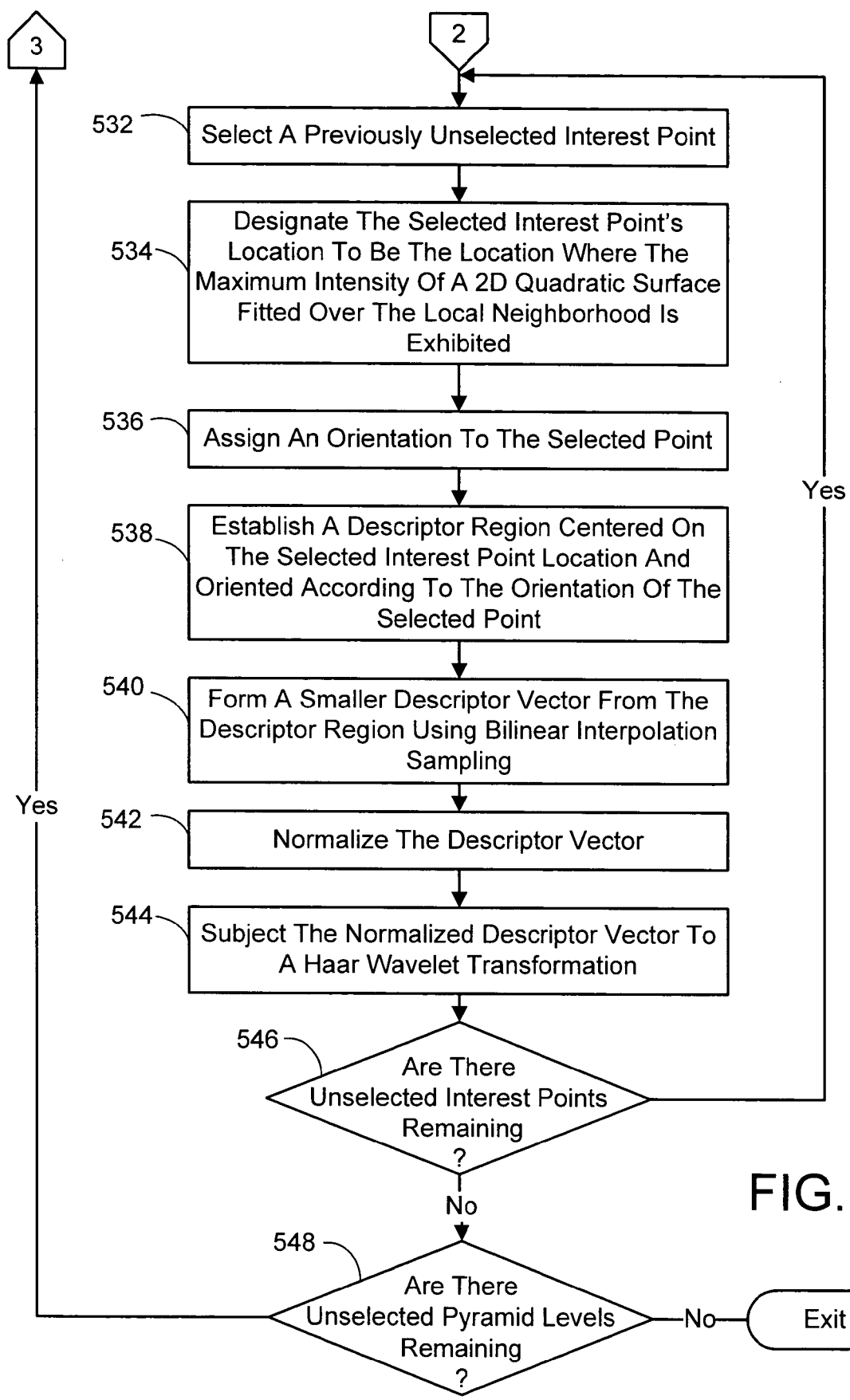

The foregoing description of the technique for generating a descriptor for each interest point according to the embodiment of the present system and process that employs Harris corner features to define the interest points and a blurred local gradient approach to establishing an orientation for each feature, is summarized in the process flow diagram of FIGS. 5A-C. The process begins by identifying interest points in the images. More particularly, for each image, an image resolution pyramid is formed (process action 500). Then, a previously unselected pyramid level is selected (process action 502), and the location of each Harris corner in the selected level is identified (process action 504). A previously unselected one of the Harris corners is selected next (process action 506), and it is determined if the corner strength of the selected corner is a local maximum in a pixel neighborhood of a prescribed minimum neighborhood radius centered on the interest point representing the location of the corner (process action 508). If the corner strength of the selected corner is a local maximum, then it is also determined if the corner strength exceeds a prescribed minimum strength threshold (process action 510). If so, the selected corner is designated as a candidate corner (process action 512) and other corners (if any) are tested. However, if it is determined that the corner strength is not a local maximum or if it is determined that the corner strength does not exceed the minimum threshold, then the selected corner is eliminated from consideration and other corners (if any) are tested. Thus, either way, the next action entails determining if there are any previously unselected corners yet to consider (process action 514). If there are remaining corners to consider, then the foregoing process is repeated starting with process action 506. Otherwise, the process continues with process action 516 where the last-used neighborhood radius is incremented by a prescribed integer value (e.g., by 1). The foregoing screening procedure is then repeated for each of the candidate corners. Specifically, a previously unselected candidate corner is selected (process action 518), and it is determined if its corner strength is a local maximum in a pixel neighborhood defined by the current neighborhood radius value (process action 520). If the corner strength of the selected candidate corner is a local maximum, then it is determined if it also exceeds the minimum strength threshold (process action 522). If so, the selected corner keeps its candidate corner designation (process action 524), and other candidate corners (if any) are considered. However, if it is determined that the corner strength is not a local maximum or if it is determined that it does not exceed the minimum threshold, then the selected candidate corner is eliminated from consideration and other candidate corners (if any) are tested. Thus, in either case, the next action is to determine if there are any previously unselected candidate corners yet to consider (process action 526). If there are remaining corners to consider, then the part of the process starting at process action 518 is repeated. If there are no remaining candidate corners to test, it is next determined whether the number of corners still designated as candidate corners exceeds a prescribed maximum allowable number (process action 528). If the maximum allowable number of candidate corners is exceeded, then process actions 516 through 528, are repeated as appropriate until the number of candidate corner no longer exceeds the maximum allowed.

Once an acceptable number of candidate corners remains, the process continues with designating the points which define the location of each of the remaining candidate corners as interest points for the image under consideration (process action 530). Next, a previously unselected interest point is selected (process action 532), and it location is refined. More particularly, in process action 534, the location of the interest point is designated as the location where the maximum intensity of a 2D quadratic surface fitted over a local neighborhood of a prescribed size, which is centered on the selected point, is exhibited.

Once the refined location of the selected interest point is established, an orientation is assigned to the point (process action 536). As indicated previously, this is accomplished in tested embodiments of the present invention using a blurred gradient approach. The location and orientation of the selected interest point are next used to generate a descriptor vector for the point. This is accomplished by first establishing a descriptor region (or patch) of a prescribed p×p size, which is centered on the interest point location and oriented according to the orientation of the interest point (process action 538). A smaller descriptor vector of a prescribed size d×d is then formed from the descriptor region using bilinear interpolation sampling the intensity values (process action 540), as described previously. This descriptor vector is next normalized (process action 542) and subjected to a Haar wavelet transformation (process action 544). The transformed descriptor vector represents the descriptor for the selected interest point. This process is then performed on the other interest points by first determining if there are any unselected interest points remaining (process action 546). If so, the process actions 532 through 546 are repeated as appropriate until all the interest points have a transformed descriptor vector associated with them.

Finally, the descriptor generation process is performed for all the other resolution levels of the image pyramid by first determining if there are any previously unselected pyramid levels remaining (process action 548). If there are, then process actions 502 through 548 are repeated as appropriate. Once complete there is a transformed descriptor vector associated with each interest point found on every level of the image pyramid. It is noted that instead of computing the orientation and generating a transformed descriptor vector for each interest point as it is identified as described above, it is also possible to identify all the interest points, and then determine their orientation and generate transformed descriptor vectors in a batch manner as an alternate approach.

2.2 Feature Matching

Given the multi-scale oriented patches extracted from all n images in a set of images of a scene, the goal of feature matching is to find geometrically consistent matches between all of the images. To accomplish this task, first a probabilistic model for feature matching is developed. This leads to a simple constraint for feature match verification which will be called the "outlier distance constraint". Further, geometric constraints can be applied to reject outliers and find the image matches, either in addition to applying the outlier distance constraint or in lieu of it.

2.2.1 Probabilistic Model for Feature Matching

Ideally one could compute the distribution of errors $p(e_{image})$ for correct and incorrect matches from training data, and use this to make a probabilistic decision as to whether a given feature match $\hat{e}_{image}$ is correct or incorrect. However, it has been found that the image based error $$e_{image} = |I'(x') - (\alpha I(x) + \beta)| \qquad (14)$$

is a poor metric for determining whether a feature match is correct/incorrect. In fact, it was found that the values of $|e_{image}|$ for correct and incorrect matches are often indistinguishable, and it would not be possible to threshold $|e_{image}|$ to select correct/incorrect matches.

The error associated with the nearest neighbor matches for patches with varying contrast is also a concern. It has been found that while there is always a clear gap between the errors for correct and incorrect matches, the scale of the errors varies tremendously. In particular, the errors are larger for patches with high contrast, and smaller for the low contrast patches. This makes it difficult to distinguish between correct and incorrect matches when low contrast patches are involved.

One possible solution is to normalize the patches for contrast, which is equivalent to computing the errors in feature space, i.e., $$e_{feature} = \left| \frac{I'(x') - m'}{\sigma'} - \frac{I(x) - m'}{\sigma} \right| \qquad (15)$$

The distribution of $e_{feature}$ for correct and incorrect matches is better separated, but with no obvious threshold. So it seems that the size of the matching errors is not purely a matter of contrast. It is believed that high frequency content is also important—e.g., a feature with large gradients would have large errors for any misregistrations.

However, it has been found that, on a feature by feature basis, there is a bimodal distribution of feature distances corresponding to correct and incorrect matches. In fact, it seems that the distance of incorrect matches from the query is almost constant. It is believed that this phenomenon is related to a property of high-dimensional spaces known as the shell property.

In high-dimensions, most of the volume of a hypersphere is concentrated in the outside shell. This means that for common distributions such as the Gaussian distribution, most of the probability mass is located in an outside shell. Consider a set of uniformly distributed points in a d-dimensional hypercube. The number of points within a distance r of the centre increases as $r^d$, until the boundary of the space is reached, whereupon it rapidly falls off. As d becomes large, this means that almost all points have the same distance from a given query point, i.e., they live in a thin shell at a constant distance from the query. Note however, that the value of this distance depends upon the position of the query point in the space. For example, a point towards the edge has a larger distance than a point in the center.

It has been suggested by Lowe [11] that while thresholding based on the 1st nearest neighbor (1-NN) distance is unreliable, the ratio of distances between the first and second nearest neighbors $e_{1-NN}/e_{2-NN}$ is a good metric for determining if a match is correct. In the multi-image matching case, there may be more than one correct match, so instead the ratio $e_i/e_{outlier}$ is examined, where $e_i$ is the distance of the match being considered and $e_{outlier}$ is the 'outlier distance'. It is assumed that there are at most k matches per feature $i \in \{1 \ldots k\}$ and the outlier distance is computed as the average distance of nearest neighbors k+1 to $k+n_o$. Using a Bayes decision rule one could classify matches as follows $$p_{correct}(e/e_{outlier}) > p_{incorrect}(e/e_{outlier}) \qquad (16)$$

This amounts to classifying a feature match as correct if $$e < 0.65 \times e_{outlier} \qquad (17)$$

This is referred to as the "outlier distance constraint". A question remains as to how to optimally compute $e_{outlier}$.

Note that since $\sigma' \times e_{feature} = e_{image}$, distances relative to the outlier distance are the same in feature space as for image based distances. This has the advantage that one can simply compare feature space image distances and apply the outlier distance constraint without having to compute $\alpha, \beta$ for each pair.

2.2.2 Feature Matching Using Outlier Rejection

The feature matching procedure begins with a fast approximation of the nearest neighbors to each of the previously computed descriptor vectors. These nearest neighbor vectors represent candidate matching points between the images. Next, in tested embodiments of the present feature matching technique, a two phase approach is employed eliminate erroneous matches. Specifically, a non-geometric outlier rejection technique is used that exploits the aforementioned outlier distance constraint to eliminate false matching points. Finally, a standard geometric outlier rejection technique is employed to further eliminate any remaining false matching points. However, as indicated previously, one or the other of these rejection techniques could be bypassed depending on the accuracy required and the processing limitations of the system employing the present feature matching technique.

2.2.2.1 Fast Approximate Nearest Neighbors Using Wavelet Indexing

Features are extracted from all images and each is matched to k approximate nearest neighbors in feature space. Fast approximate nearest neighbor computation is achieved by indexing features using a hash table. The hash table is 3-dimensional and the dimensions correspond to the first 3 non-zero wavelet coefficients $c_1, c_2, c_3$, which are estimates of $$\frac{\partial I}{\partial x}, \frac{\partial I}{\partial y}, \frac{\partial^2 I}{\partial xly}$$

over the patch. In tested embodiments, k=4, and the hash table has b=10 bins per dimension (which cover $\pm n_o = 3$ standard deviations from the mean of that dimension). The bins are overlapped by one half so that data within $$\frac{1}{2}$$

bin width $$\left( = \frac{2n_\sigma}{b-1} \frac{1}{2} = \frac{\sigma}{3} \right)$$

are guaranteed to be matched. These are approximate nearest neighbors as it is possible (but low probability) that the true nearest neighbor lies outside $$\frac{\sigma}{3}$$

in one of the 3 dimensions. Each descriptor vector is matched to all features in the same bin, and the k approximate nearest neighbors are selected. The outlier distance constraint is then employed to verify correct matches and eliminate outliers as will be described next. It is noted that the distance between the features is used to determine the nearest neighbors. In tested embodiments, these distances are computed as the sum of the squared differences of the 64 dimensional feature vectors.

2.2.2.2 Outlier Rejection Using the Outlier Distance Constraint

The aforementioned shell property can be used as the basis of an outlier rejection strategy, since almost all of the incorrect matches will have approximately the same distance (i.e., the outlier distance) from the query point, whereas the correct matches will differ only due to imaging and detection noise. One way the outlier distance can be estimated is to equate it to the mean or minimum of the 2-NN distances for each image. With the outlier distance computed, the outlier distance constraint can be applied to reduce the number of false matches. More particularly, if a vector found to be one of the nearest neighbors to a vector under consideration has a distance from that vector within 65% of the outlier distance, then that vector is considered to be associated with a matching point. If the vector distance in not within 65% of the outlier distance, then the point associated with it is not considered a matching point.

2.2.2.3 Outlier Rejection Using Geometric Constraints

Once the candidate matches have been refined using the outlier distance constraint, the matches can be further refined by employing a geometrical matching constraint. Essentially, this involves using standard methods to determine if the remaining matching points actually correspond in the images of the scene. If the images were taken from a point and the scene is static, a panoramic motion model (homography) is appropriate. If the images were taken with a moving camera and static scene, a full 3D motion model (fundamental matrix) is appropriate. It would also be possible to devise more elaborate motion models for multiple or moving objects. For automatic panorama stitching, the panoramic motion model and probabilistic model for matching as in [6] is an appropriate choice. Any point from one image found not to actually match a point in another image depicting the same part of the scene is eliminated from the set of matching points.

2.2.3 The Feature Matching Process Summary

Figure 11:
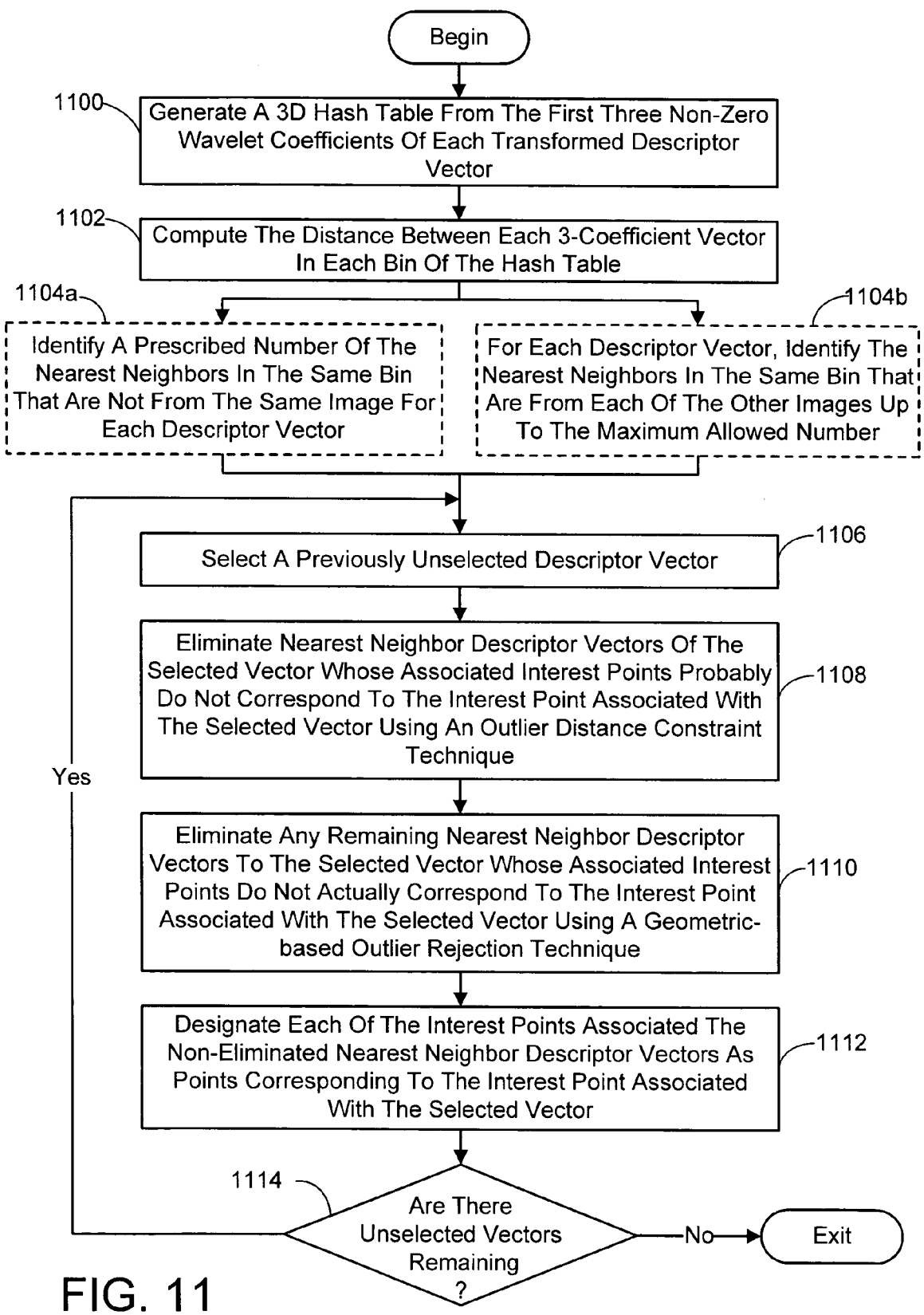
FIG. 11 is a flow chart diagramming a process for finding corresponding points between images of a scene using descriptor vectors generated in accordance with FIGS. 5A-5C.

The foregoing description of the feature matching technique for identifying corresponding points among a series of images of a scene according to the embodiment of the present system and process that employs a 3D hash table and outlier rejection based at least in part on an outlier distance constraint, is summarized in the process flow diagram of FIG. 11. The process begins by matching each transformed descriptor vector to a prescribed number of its nearest neighbors in feature space. More particularly, a 3D hash table is generated from the first three non-zero wavelet coefficients of each transformed descriptor vector (process action 1100). As indicated previously, in tested embodiments of the present feature matching technique, the hash table has 10 bins per dimension and each bin has overlapping ranges of one half. The distance between each 3 coefficient vector in each bin of the hash table is then computed (process action 1102). These distances are next used, for each descriptor vector, to identify a prescribed number of its nearest neighbors in the same bin that are not from the same image as the vector under consideration (process action 1104a). It is noted that in an alternate embodiment of the feature matching technique, the following action 1104b is substituted for process action 1104a. Namely, for each descriptor vector, its nearest neighbors in the same bin that are from each of the other images are identified up to a prescribed maximum number. The alternate nature of actions 1104a and 1104b are indicated in FIG. 11 by the use of dashed line boxes.

Once the nearest neighbors for each descriptor vector have been identified, a previously unselected vector is selected (process action 1106). The nearest neighbor descriptor vectors to the selected vector whose associated interest points do not actually correspond to the interest point associated with the selected vector are then eliminated from consideration. More particularly, in tested embodiments of the present feature matching technique this is done in two phases, as indicated previously. The first phase (process action 1108), referred to as outlier rejection using an outlier distance constraint, is a quick procedure than eliminates many of the probable non-corresponding points. The second phase (process action 1110), referred to as outlier rejection using geometric constraints, employs more exacting geometric-based comparisons as described previously, albeit at a higher computational cost. However, as many of the erroneous matches have been eliminated in the first phase, the second phase processing requirements are minimized. In essence, the second phase geometric based outlier rejection procedure involves finding a transform that best matches all the points between two images and throwing out points that do not correspond within a specified tolerance when transformed. FIGS. 8(a) and 8(b) exemplify the value of the outlier rejection processing. These figures show two images of a mountain scene with portions in common where the corresponding locations between the images, as identified before any outlier rejection processing, are shown as white dots (587 matches). FIGS. 9(a) and 9(b) show the same images as FIGS. 8(a) and 8(b), respectively, after the application of the outlier rejection technique using the outlier distance constraint. Here 242 outliers have been eliminated leaving 345 matches. FIGS. 10(a) and 10(b) show the same images as FIGS. 9(a) and 9(b), respectively, after the application of the geometric based outlier rejection technique. Another 34 outliers were identified and eliminated, leaving a final total of 311 corresponding points between the images.

It is noted that if the first phase outlier rejection procedure produces adequately accurate results for the particular application of the present feature matching technique, then if desired, the second phase could be skipped. Conversely, if processing costs are not a concern, then the second phase geometric based outlier rejection procedure could be employed on its own and the first phase skipped.

In regard to the first outlier rejection technique, in tested embodiments this involves first computing the outlier distance for the selected descriptor vector and its nearest neighbors, and then determining if the distance between the selected vector and any of its nearest neighbors is equal to or more than about 65% of the outlier distance. Whenever a nearest neighbor vector is found to have a distance to the selected vector that is equal to or more than about 65% of the outlier distance, it is eliminated from consideration as representing a point corresponding to the interest point associated with the selected vector.

Once the outlier rejection procedure is complete, each of the interest points associated descriptor vectors that were identified as nearest neighbors to the selected vector, and which have not been eliminated from consideration, are designated as points corresponding to the interest point associated with the selected vector (process action 1112). The foregoing process is next performed for each of the other descriptor vectors to determine their corresponding points in the other images by first determining if there are any unselected vectors remaining (process action 1114). If so, the process actions 1106 through 1114 are repeated as appropriate until all the vectors have been processed. When all the vectors have been selected and processed, the procedure ends.

3.0 REFERENCES

[1] P. Anandan. A Computational Framework and an Algorithm for the Measurement of Visual Motion. *International Journal of Computer Vision*, 2:283-310.1989.

[2] J. Bergen, P. Anandan, K. Hanna, and R. Hingorani. Hierarchical Model-Based Motion Estimation. In *Proceedings of the European Conference on Computer Vision*, pages 237-252. Springer-Verlag, May 1992.

[3] A. Baumberg. Reliable Feature Matching Across Widely Separated Views. In *Proceedings of the International Conference on Computer Vision and Pattern Recognition*, pages 774-781, 2000.

[4] C. Bishop. *Neural Networks for Pattern Recognition*. Oxford, ISBN: 0198538642, 1995.

[5] M. Brown and D. Lowe. Invariant Features from Interest Point Groups. In *Proceedings of the 13th British Machine Vision Conference*, pages 253-262, Cardiff, 2002.

[6] M. Brown and D. Lowe. Recognising panoramas. In *Proceedings of the 9th International Conference on Computer Vision*, volume 2, pages 1218-1225, Nice, October 2003.

[7] G. Carneiro and A. Jepson. Multi-scale Local Phase-based Features. In *Proceedings of the International Conference on Computer Vision and Pattern Recognition*, 2003.

[8] C. Harris. Geometry from Visual Motion. In A. Blake and A. Yuille. editors, *Active Vision*. pages 263-284. MIT Press, 1992.

[9] B. Lucas and T. Kanade. An Iterative Image Registration Technique with an Application to Stereo Vision. In *In proceedings of the 7th International Joint Conference on Artificial Intelligence*, pages 674-679, 1981.

[10] D. Lowe. Object Recognition from Local Scale-Invariant Features. In *Proceedings of the International Conference on Computer Vision*, pages 1150-1157. Corfu, Greece, September 1999.

[11] D. Lowe. Distinctive Image Features from Scale-Invariant Key-points. *International Journal of Computer Vision*, 2004.

[12] J. Matas, O. Chum, M. Urban, and T. Pajdla. Robust wide baseline stereo from maximally stable extremal regions. In *Proceedings of the British Machine Vision Conference*, 2002.

[13] K. Mikolajczyk and C. Schmid. A Performance Evaluation of Local Descriptors. In *Proceedings of the International Conference on Computer Vision and Pattern Recognition*, 2003.

[14] C. A. Rothwell. A. Zisserman, D. A. Forsyth, and J. L. Mundy. Canonical frames for planar object recognition. In *Proceedings of the European Conference on Computer Vision*, pages 757-772, 1992.

[15] C. Rothwell. A. Zisserman, D. Forsyth, and J. Mundy. Planar Object Recognition Using Projective Shape Representation. In *International Journal of Computer Vision*, number 16, pages 57-99, 1995.

[16] C. Schmid and R. Mohr. Local Grayvalue Invariants for Image Retrieval. *IEEE Transactions on Pattern Analysis and Machine Intelligence*, 19(5):530-535, May 1997.

[17] C. Schmid, R. Mohr, and C. Bauckhage. Evaluation of Interest Point Detectors. In *Proceedings of the International Conference on Computer Vision*, pages 230-235, Bombay, 1998.

[18] Jianbo Shi and Carlo Tomasi. Good features to track. In *IEEE Conference on Computer Vision and Pattern Recognition (CVPR '94)*, Seattle, June 1994.

[19] F. Schaffalitzky and A. Zisserman. Multi-view Matching for Unordered Image Sets, or "How Do I Organise My Holiday Snaps?". In *Proceedings of the European Conference on Computer Vision*, pages 414-431, 2002.

[20] T. Tuytelaars and L. Van Gool. Wide Baseline Stereo Matching based on Local, Affinely Invariant Regions. In *Proceedings of the 11th British Machine Vision Conference*, pages 412-422, Bristol, UK, 2000.

Wherefore, what is claimed is:

1. A computer-implemented process for identifying corresponding points among multiple images of a scene, comprising using a computer to perform the following process actions:

identifying interest points in each image, at varying resolutions, whose locations within the image depicting the point are defined by at least one property attributable to the pixels in a first prescribed-sized neighborhood around the point, and which can be assigned a unique orientation based on least one property attributable to the pixels in a second prescribed-sized neighborhood around the point;

generating a descriptor for each of the interest points which characterizes each point in a manner that is substantially invariant to changes in image location, orientation, and scale, as well as to changes in the intensity of the pixels used to define the location and orientation of the point;

finding substantially matching descriptors among the images; and designating the interest points associated with each set of matching descriptors that appear in different images as corresponding points.

2. The process of claim 1, wherein the process action of identifying interest points in each image, comprises, for each image, the actions of:

forming an image resolution pyramid, and for each level of the pyramid, identifying locations in the image under consideration representative of a corner feature, identifying the orientation of each corner feature, designating the identified location of each corner feature as a separate interest point, and assigning the identified orientation of each corner feature to the interest point associated with that feature.

3. The process of claim 2, wherein the process action of identifying locations in the image under consideration representative of a corner feature, comprises the actions of:

identifying the location of each corner feature which exhibits a corner strength that is a local maximum of a pixel neighborhood of a prescribed minimum neighborhood radius that is centered on the location and which exceeds a prescribed minimum strength threshold;

incrementing the neighborhood radius by a prescribed integer value, and identifying those previously identified locations whose corner strength is still a local maximum of the pixel neighborhood currently under consideration and which still exceeds the prescribed minimum strength threshold;

repeating the incrementing and second identifying actions until the number of locations identified is no larger than a prescribed maximum number; and designating each of the remaining identified locations as representative of a separate corner feature.

4. The process of claim 2, wherein the process action of designating the identified location of each corner feature as a separate interest point, comprises an action of designating as the location of each interest point, the location where the maximum intensity of a 2D quadratic surface fitted over a local neighborhood of a prescribed size which is centered on the identified location under consideration, is exhibited.

5. The process of claim 2, wherein the process action of identifying the orientation of each corner feature comprises an action of identifying the orientation of each corner feature using a blurred gradient approach.

6. The process of claim 2, wherein each corner feature is a Harris corner.

7. The process of claim 1, wherein the process action of generating a descriptor for each of the interest points, comprises, for each interest point, the actions of:

establishing a descriptor region of a prescribed p×p size which is centered on the interest point location under consideration and which is oriented according to the orientation of the interest point;

forming a prescribed-sized d×d descriptor vector that is smaller than the descriptor region and sampled therefrom using bilinear interpolation of the intensity values of the pixels within the region in a manner that results in sampling roughly once per pixel;

normalizing the descriptor vector; and performing a Haar wavelet transformation on the descriptor vector to produce a transformed vector.

8. The process of claim 7, wherein the process action of finding substantially matching descriptors among the images, comprises an action of matching the transformed descriptor vectors to a prescribed number of its nearest neighbors in feature space.

9. The process of claim 8, wherein the process action of matching the transformed descriptor vectors, comprises the actions of:
   generating a 3D hash table from a prescribed number (n) of the wavelet coefficients of each transformed descriptor vector to form a hash table of n-coefficient vectors;
   for each bin of the hash table, computing the distance between each n-coefficient vector found in the bin under consideration;
   for each n-coefficient vector, identifying a prescribed number of its nearest neighbors based on the computed distances which reside in the same bin but which are not associated with the same image as the vector under consideration to form sets of potentially matching vectors;
   designating the interest points associated with the vectors in each set of potentially matching vectors as corresponding points depicting the same part of the scene in the associated images.

10. The process of claim 9, wherein the hash table has 10 bins per dimension and each bin has overlapping ranges of one half, and wherein the prescribed number (n) of the wavelet coefficients comprises the first three non-zero wavelet coefficients thereby forming a hash table of three-coefficient vectors.

11. The process of claim 9, wherein the process action of designating the interest points associated with the vectors in each set of potentially matching vectors as corresponding points, comprises the actions of:
   for each of the potentially matching vectors, eliminating any three-coefficient vectors from consideration as a potentially matching vectors whose associated interest points do not actually correspond to an interest point in another image associated with another of the three-coefficient vectors in the same set of vectors; and
   for each of the three-coefficient vectors remaining in each set of potentially matching vectors, designating the interest points associated with the vectors as corresponding points in the associated images.

12. The process of claim 11, wherein the process action of eliminating any three-coefficient vectors from consideration as a potentially matching vectors whose associated interest points do not actually correspond to an interest point in another image associated with another of the three-coefficient vectors in the same set of vectors, comprises, for each set of matched vectors, the actions of:
   computing an outlier distance for the set of matching vectors under consideration;
   determining if the distance computed for any of the matching vectors is more than about 65% of the outlier distance; and
   whenever a matching vector is found to have a distance that is more than about 65% of the outlier distance, eliminating the interest point associated with that vector as a corresponding point.

13. The process of claim 11, wherein the process action of eliminating any three-coefficient vectors from consideration as a potentially matching vectors whose associated interest points do not actually correspond to an interest point in another image associated with another of the three-coefficient vectors in the same set of vectors, comprises, for each set of matched vectors, the actions of:
   performing a geometric outlier rejection procedure; and
   eliminating the interest point associated with any vector as a corresponding point that is found to be an outlier.

14. The process of claim 8, wherein the process action of matching the transformed descriptor vectors, comprises the actions of:
   generating a 3D hash table from the first three non-zero wavelet coefficients of each transformed descriptor vector to form a hash table of three-coefficient vectors;
   for each bin of the hash table, computing the distance between each three-coefficient vector found in the bin under consideration;
   for each three-coefficient vector, identifying the nearest neighbors found in the same bin that are associated with each image respectively, except the image associated with the vector under consideration, up to a prescribed number for each image, based on the computed distances, to form sets of potentially matching vectors;
   designating the interest points associated with the vectors in each set of potentially matching vectors as corresponding points depicting the same part of the scene in the associated images.

15. The process of claim 14, wherein the hash table has 10 bins per dimension and each bin has overlapping ranges of one half.

16. The process action of claim 1, wherein the first and second prescribed-sized neighborhoods are the same size.

17. A system for identifying corresponding points among multiple images of a scene, comprising:
   a general purpose computing device;
   a computer program comprising program modules executable by the computing device, wherein the computing device is directed by the program modules of the computer program to,
      identify interest points representing potential corresponding points in each image, wherein each interest point is defined by a location and orientation assigned to it based on the pattern formed by a prescribed property of the pixels in a neighborhood centered around the point;
      generate a descriptor for each of the interest points which characterizes each point in a manner that is substantially invariant to changes in image location, orientation, and scale, as well as to changes in the bias and gain of the pixels used to define the location and orientation of the point;
      find substantially matching descriptors among the images; and
      designate the interest points associated with each set of matching descriptors that appear in different images as corresponding points.

18. The system of claim 17, wherein the program module for identifying interest points, comprises, for each image, the sub-modules of:
   (a) forming an image resolution pyramid;
   (b) selecting a previously unselected pyramid level;
   (c) identifying the location of each Harris corner occurring in the selected level;
   (d) selecting a previously unselected Harris corner;
   (e) determining if the corner strength of the selected Harris corner is a local maximum in a pixel neighborhood of a prescribed minimum neighborhood radius centered on a point representing the location of the corner and exceeds a prescribed minimum strength threshold;

(f) whenever the corner strength is a local maximum and exceeds a prescribed minimum strength threshold, designating it as a candidate corner;

(g) determining if there are any previously unselected Harris corners remaining, and whenever there are remaining corners repeat sub-modules (d) through (g) until all the corners have been considered;

(h) incrementing the last-used neighborhood radius by a prescribed integer value;

(i) selecting a previously unselected candidate corner;

(j) determining if the corner strength of the selected candidate corner exceeds the prescribed minimum strength threshold and is a local maximum in a pixel neighborhood centered on a point representing the location of the selected corner and whose size is defined by of the current neighborhood radius;

(k) whenever the corner strength is a local maximum and exceeds a prescribed minimum strength threshold, retaining its designation as a candidate corner and otherwise removing the designation;

(l) determining if there are any previously unselected candidate corners remaining, and whenever there are remaining corners repeat sub-modules (i) through (l) until all the candidate corners have been considered;

(m) determining whether the number of Harris corners still designated as candidate corners exceeds a prescribed maximum allowable number;

(n) whenever the number of candidate corners exceeds the prescribed maximum allowable number, repeating sub-modules (h) through (n) until the number of candidate corner no longer exceeds the maximum allowable number;

(o) designating the points which define the location of each of the remaining candidate corners as interest points for the image under consideration;

(p) refining the location of each interest point by designating its location to be the point where the maximum intensity of a 2D quadratic surface fitted over a local neighborhood of a prescribed size, which is centered on the selected point, occurs;

(q) assigning an orientation to each interest point determined using a blurred gradient approach; and (r) repeating sub-modules (b) through (q), until all the pyramid levels have been considered.

19. The system of claim 17, wherein the program module for generating a descriptor for each of the interest points, comprises, for each interest point, the sub-modules of:

(a) establishing a descriptor region of a prescribed size p×p, which is centered on the interest point location and oriented according to the orientation of the interest point;

(b) forming a descriptor vector of a smaller prescribed size d×d from the descriptor region using bilinear interpolation sampling of the intensity values of the region;

(c) normalizing the descriptor vector in regard to bias and gain;

(d) subjecting the normalized descriptor vector to a Haar wavelet transformation to form the descriptor of the interest point under consideration.

20. The system of claim 19, wherein the program module for finding substantially matching descriptors among the images, comprises sub-modules for:

(e) generating a 3D hash table from the first three non-zero wavelet coefficients of each interest point descriptor;

(f) computing the distance between each descriptor in each bin of the hash table;

(g) selecting a previously unselected descriptor;

(h) identifying a prescribed number of the selected descriptors nearest neighbors in the same bin that are not associated with the same image as the selected descriptor;

(i) computing an outlier distance for the selected descriptor and its nearest neighbors;

(j) respectively determining if the computed distance between the selected descriptor and each of its nearest neighbors is less than about 65% of the outlier distance;

(k) whenever it is found that the computed distance between the selected descriptor and one its nearest neighbors is less than about 65% of the outlier distance, designating the nearest neighbor descriptor as a matching descriptor with regard to the selected descriptor; and (l) performing a geometric-based outlier rejection procedure to determine if any of the interest points corresponding to the descriptors designated as matching the selected descriptor does not substantially correspond to the location of the interest point of selected descriptor;

(m) eliminating as a matching descriptor any descriptor designated as matching the selected descriptor that does not substantially correspond to the location of the interest point of selected descriptor; and (n) repeating sub-modules (g) through (m) until all the remaining descriptors have been considered.

21. The system of claim 19, wherein the program module for finding substantially matching descriptors among the images, comprises sub-modules for:

(e) generating a 3D hash table from the first three non-zero wavelet coefficients of each interest point descriptor;

(f) computing the distance between each descriptor in each bin of the hash table;

(g) selecting a previously unselected descriptor;

(h) identifying a prescribed number of the selected descriptors nearest neighbors in the same bin that are not associated with the same image as the selected descriptor;

(i) computing an outlier distance for the selected descriptor and its nearest neighbors;

(j) respectively determining if the computed distance between the selected descriptor and each of its nearest neighbors is less than about 65% of the outlier distance;

(k) whenever it is found that the computed distance between the selected descriptor and one its nearest neighbors is less than about 65% of the outlier distance, designating the nearest neighbor descriptor as a matching descriptor with regard to the selected descriptor; and (l) repeating sub-modules (g) through (k) until all the remaining descriptors have been considered.

22. The system of claim 19, wherein the program module for finding substantially matching descriptors among the images, comprises sub-modules for:

(e) generating a 3D hash table from the first three non-zero wavelet coefficients of each interest point descriptor;

(f) computing the distance between each descriptor in each bin of the hash table;

(g) selecting a previously unselected descriptor;

(h) identifying a prescribed number of the selected descriptors nearest neighbors in the same bin that are not associated with the same image as the selected descriptor;
(i) performing a geometric-based outlier rejection procedure to determine which of the interest points corresponding to the nearest neighbor descriptors substantially correspond to the location of the interest point of selected descriptor;
(j) designating a nearest neighbor descriptor as a matching descriptor with regard to the selected descriptor only if it is found that the interest point corresponding to the nearest neighbor descriptor substantially corresponds to the location of the interest point of selected descriptor.
(k) repeating sub-modules (g) through (j) until all the remaining descriptors have been considered.

23. A computer-readable medium having computer-executable instructions for identifying corresponding points among multiple images of a scene, said computer-executable instructions comprising:

identifying interest points representing potential corresponding points in each image, wherein each interest point corresponds to a location in an image that is identifiable by a unique pattern formed by a prescribed property of the pixels in a neighborhood centered around the location;

assigning an orientation to each interest point, wherein the orientation is derived from said pattern formed by the prescribed property of the pixels in the neighborhood centered around the interest point;

generating a descriptor for each of the interest points which characterizes each point in a manner that is substantially invariant to changes in image location, orientation, and scale, as well as to changes in the bias and gain of the pixels used to define the location and orientation of the point;

finding substantially matching descriptors among the images; and designating the interest points associated with each set of matching descriptors that appear in different images as corresponding points.

* * * * *